April 27, 1937.  W. W. SAYERS  2,078,720
POSITIVE DRIVE MECHANISM
Filed March 16, 1935   3 Sheets-Sheet 1

Inventor
William W. Sayers
by Parker & Carter
Attorneys.

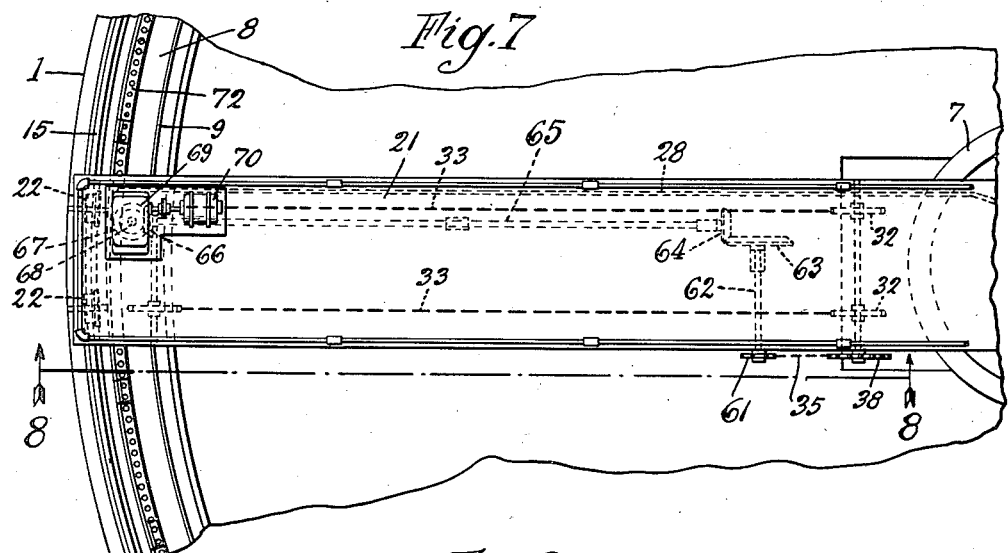
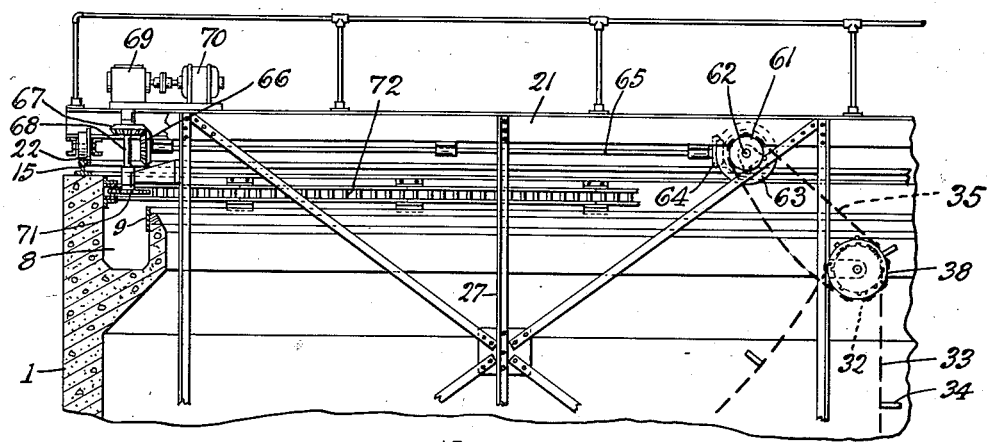
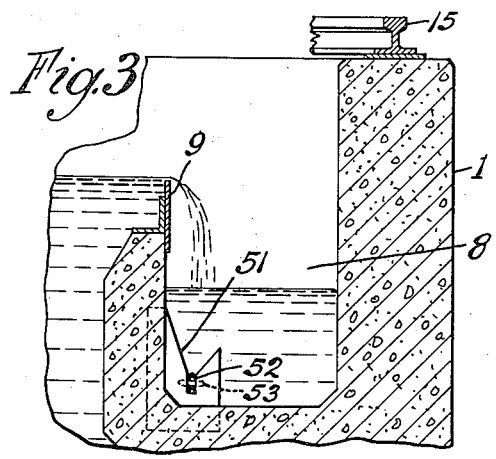
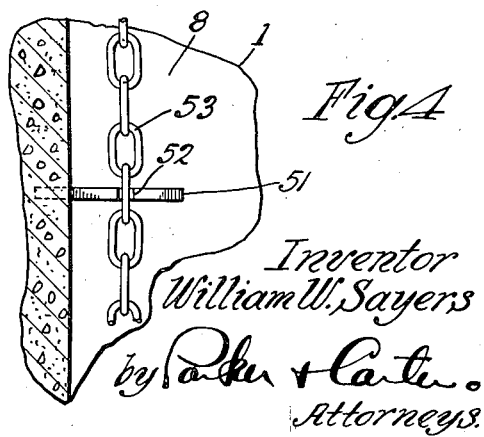
Inventor
William W. Sayers
by Parker + Carter
Attorneys.

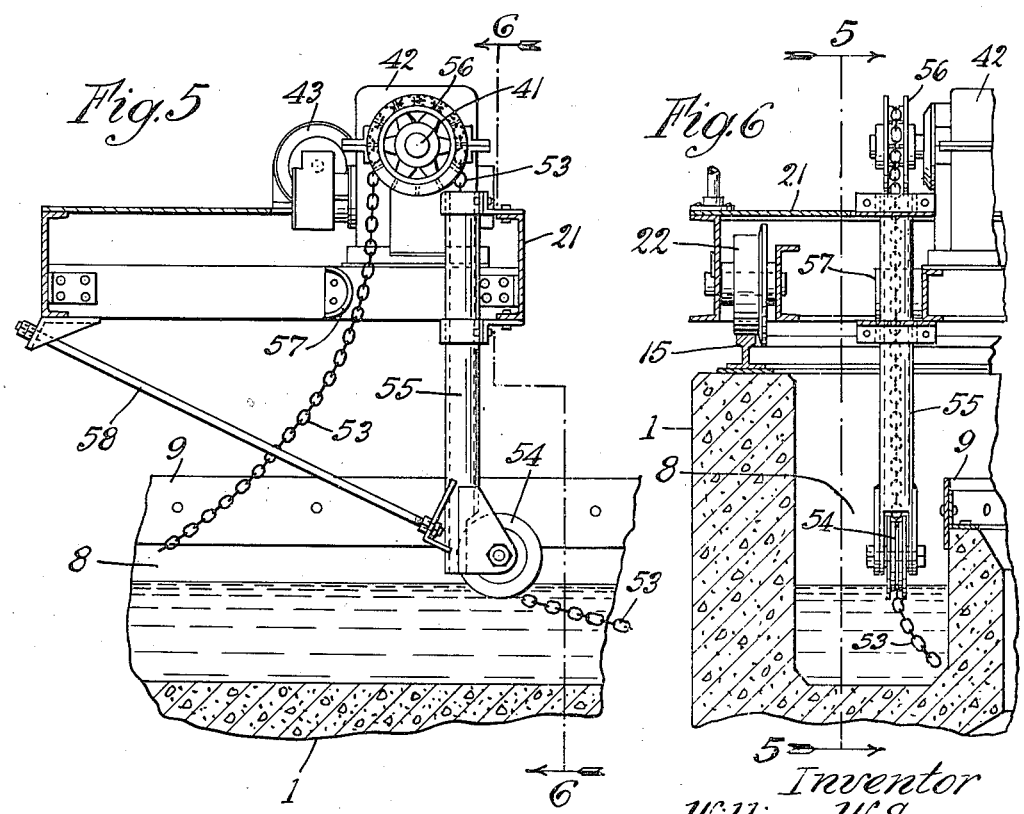

Patented Apr. 27, 1937

2,078,720

UNITED STATES PATENT OFFICE 2,078,720

POSITIVE DRIVE MECHANISM

William W. Sayers, Chicago, Ill., assignor to Link-Belt Company, a corporation of Illinois Application March 16, 1935, Serial No. 11,482

8 Claims. (Cl. 210—55)

My invention relates to improvements in driving means for traveling and swinging bridges and the like and while especially applicable to the drive mechanism for a bridge or switch associated with the sludge collecting means in a sedimentation tank, may with equal facility be used for handling other types of bridges under other circumstances and for different purposes.

One object of my invention is to provide a positive driving means for the swinging bridge which carries the sludge collecting mechanism in a sedimentation tank. Another object is to provide a positive means for holding an endless drive cable in place when power is applied to it to propel some other mechanism. Other objects will appear from time to time throughout the specification and claims.

My invention is illustrated more or less diagrammatically in the accompanying drawings, wherein—

Figure 3 is an enlarged detail section along the line 3—3 of Figure 1;

Figure 4 is a plan view in part section of the device shown in Figure 3;

Figure 5 is a section on an enlarged scale along the line 5—5 of Figure 1;

Figure 6 is a section along the line 6—6 of Figure 5, Figure 5 being also taken along the line 5—5 of Figure 6;

Figure 7 is a plan view of a modified form of driving mechanism;

Figure 8 is a section along the line 8—8 of Figure 7.

Like parts are illustrated by like characters throughout the specification and drawings.

Figure 1:
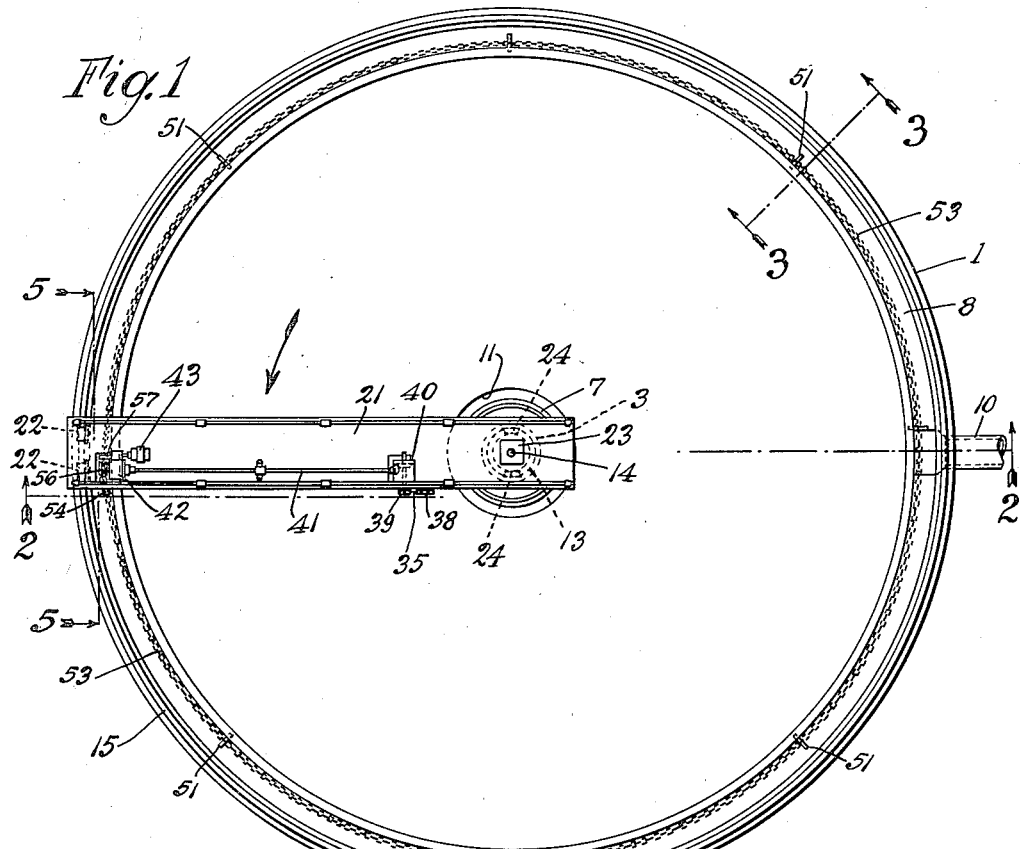
Figure 1 is a plan view of a sedimentation tank showing my apparatus in place.
Figure 2:
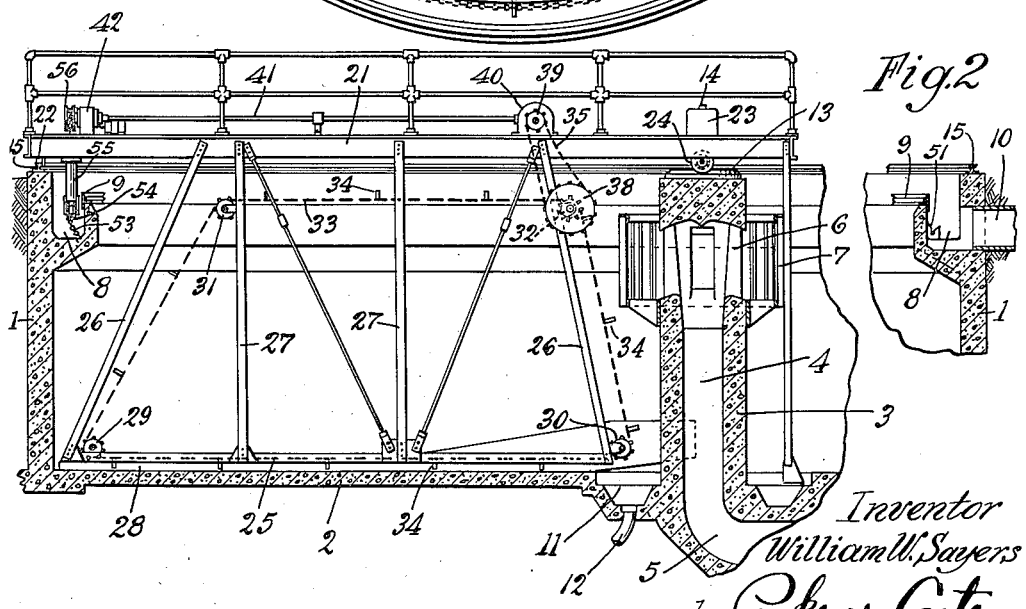
Figure 2 is a section along the line 2—2 of Figure 1.

1 is a generally cylindrical sedimentation tank having a flat floor 2, a central column 3, the column containing an influent channel 4, adapted to discharge sewage through the port 6, into the sedimentation tank. 7 is a grid encircling the end of the column for the purpose of checking the flow of the sewage. 8 is an annular effluent channel formed upon the inner periphery of the cylindrical wall of the tank 1, and having the usual adjustable effluent weir 9, the effluent flowing out from the channel through the pipe 10. 11 is a sludge trough, sludge being discharged therefrom through a pipe 12. The column 3, supports the turntable track 13, and pivot pin 14, rigidly mounted thereon and a track 15 is mounted on the wall of the tank 1, concentric with the pin 14.

21 is a bridge. It is supported at its outboard end by rollers, 22, adapted to travel along the track, 15. At its inboard end it has a bearing, 23, on the pin, 14, and has two tapered rollers, 24, traveling along the turntable track, 13. A ladder, 25, is supported below the bridge by means of uprights, 26, 27, and carries at its lower end a radial screed 28. Idler sprockets, 29, 30, 31 and a driving sprocket, 32, are all mounted on the ladder, 25, and supporting structures. 33 is a chain conveyor having flights, 34, adapted to be operated so as to cause the flights to move inwardly in front of the screed and propel sludge along the bottom of the tank to the sludge hopper, 11. 35 is a drive chain over a sprocket, 38, mounted for rotation with the sprocket, 32. It is driven by a sprocket, 39, which in turn by means of miter gears in the gear box, 40, not illustrated in detail, is driven by means of a shaft, 41, from a gear box, 42, which gear box is driven by a motor, 43.

51, 51, are a series of chain cable supporting brackets mounted in the wall of the effluent channel, 8, notched as at 52 to engage the chain cable, 53, as indicated specifically in Figures 3 and 4. This chain cable, 53, is longer than the peripheral length of the effluent channel and is endless. The cable is at spaced points supported in the brackets, 51, and because of the engagement of the links in the slots or notches, 52, the cable is held by these brackets against longitudinal displacement. The bight of the cable extends upwardly over the idler pulley, 54, through the supporting pipe, 55, which carries the idler pulley and passes over a pocketed chain wheel, 56, which is driven by the gear box, 42. The chain when it leaves the pocketed wheel, 56, passes down in front of the curved guide, 57, to return to the effluent channel. 58 is a tension rod extending diagonally downwardly from the end of the bridge to the end of the pipe, 55, so as to assist in carrying the tension load of the cable, 53, when the pocketed wheel, 56, is rotated by the motor to cause a sweeping action of the bridge.

In the modified form shown in Figures 7 and 8, the chain sprocket 61 is on a cross shaft, 62, which terminates in a miter gear, 63, in mesh with a miter pinion, 64, on the shaft 65, which shaft terminates in a miter gear, 66, in mesh with a miter gear, 67, on the vertical shaft, 68. The vertical shaft, 68, extends downwardly from the gear box, 69, which is driven by the motor, 70. The lower end of the vertical shaft, 68, carries a gear, 71, which gear is in mesh with an annular rack, 72, mounted on the inner wall of the tank, 1, in this case above the weir so that the gear and rack are above the level of the liquid in the tank. In this case, when the motor rotates, the gear pulls the bridge around by meshing with the rack, 72.

It will be realized that whereas I have herewith shown and described a practical operative device, nevertheless many changes might be made in the size, shape, number and disposition of parts without departing from the spirit of my invention and I wish, therefore, that my showing be taken as in a sense diagrammatic.

The notched supporting brackets 51, as shown in detail in Figures 3 and 4, may in some installations be omitted because it will often be found that the weight or "wrap" of the chain or cable furnishes such traction. In other words, even without the brackets 51 or 90 the chain will not slip and will furnish adequate traction for moving the bridge. Under these circumstances the wrap of the chain around the tank or in the effluent trough furnishes the means for holding the means in position.

While the invention, as illustrated, includes an endless track, it is not limited to that and it might be used in connection with a device in which the bridge instead of moving around a circular or other endless track, reciprocates. In other words the invention is not limited to any particular shape of track, nor is it limited to rotation as opposed to back and forth or reciprocating travel, nor is it limited to any particular shape of tank, where it is applied to a tank. For purposes of simplicity the invention is shown in the accompanying drawings as applied to a circular tank but it can equally well be applied to a tank of any size and shape, and it is not to be limited in its application to a tank and it may be used in connection with, and applied to, any suitable material handling and storage installation.

In the claims where the word "tank" is used, it is to be understood as meaning, therefore, any storage or treating installation and it is not to be limited in its meaning merely to a tank capable of holding liquid.

In the same manner the word "bridge", where it occurs in the claims, is not to be limited strictly to a bridge but is to be read as covering a structure such as that shown, or its equivalent. In that sense the bridge is merely a structural member spanning a gap and carrying some one or more forms of conveying or collecting mechanisms and a part at least of the means for driving such mechanism or mechanisms.

I claim:

1. In a settling tank, a bridge, a track adjacent the peripheral wall thereof adapted to support one end of the bridge, positive means associated with the supported end of the bridge for moving it along the track, means associated with the bridge and adapted to move therewith along the bottom of the tank for collecting material settled therein, said positive means comprising a cable, means for holding it against longitudinal movement, means on the bridge adapted to grip the cable and exert a tension thereupon to cause movement of the bridge, said means including a guide pulley adjacent the normal position of the cable, a driven pulley over which the cable travels, a support for the pulley comprising a pipe depending downwardly from the bridge, a stay extending from a point on the bridge to the pulley, the cable driving means being located at the upper end of the pipe, the cable passing upwardly through the pipe from the pulley to the driving means.

2. In a settling tank, a bridge, a track adjacent the peripheral wall thereof adapted to support one end of the bridge, positive means associated with the supported end of the bridge for moving it along the track, means associated with the bridge and adapted to move therewith along the bottom of the tank for collecting material settled therein, said positive means comprising a chain cable, a plurality of brackets adapted to support the cable, the brackets being notched to engage a cable link and prevent passage of adjacent links therethrough, a pulley on the bridge adjacent the normal position on the cable and a pocketed chain wheel over which the cable may travel, power means adapted to drive said wheel, a support for the pulley comprising a pipe depending downwardly from the bridge, a stay extending from a point on the bridge to the pulley, the cable driving means being located at the upper end of the pipe, the cable passing upwardly through the pipe from the pulley to the driving means.

3. In a settling tank, a bridge, a track adjacent the peripheral wall thereof adapted to support one end of the bridge, positive means associated with the supported end of the bridge for moving it along the track, means associated with the bridge and adapted to move therewith along the bottom of the tank for collecting material settled therein, an effluent channel about the inner periphery of the tank at the discharge level of the liquid thereof, a cable supported within the effluent channel and means for anchoring it in position against longitudinal displacement while leaving it free to move along vertical lines, a pulley supported on the bridge, extending downwardly into the effluent channel and located adjacent the normal position of the cable, means on the bridge above the liquid level for driving the bridge, comprising a pulley over which the cable passes after it leaves the first mentioned pulley and means for driving said pulley to exert a tension on the cable.

4. In a settling tank, a bridge, a track adjacent the peripheral wall thereof adapted to support one end of the bridge, positive means associated with the supported end of the bridge for moving it along the track, means associated with the bridge and adapted to move therewith along the bottom of the tank for collecting material settled therein, an effluent channel encircling the tank about its inner periphery located adjacent the liquid level, an endless cable contained within the effluent channel, means in the channel adapted to support the cable and to prevent its longitudinal displacement with respect to them while permitting movement toward and from the cable supporting means, a sheave supported on the bridge depending downwardly into the effluent channel adjacent the normal position of the cable, the bight of the cable after it passes over the sheave extending upwardly to a point above the liquid level of the tank and a drive pulley over which the cable travels.

5. In a settling tank, an annular trough positioned within and below the upper margin of said tank, a bridge, a track adjacent the peripheral wall of the tank adapted to support one end of the bridge, positive means associated with the supported end of the bridge for moving it along the track, means associated with the bridge and adapted to move therewith along the bottom of the tank for collecting material settled therein, said positive means comprising a cable, means for holding it against longitudinal movement, said cable positioned within said trough, means on the bridge adapted to grip the cable and exert a tension thereupon, to cause movement of the bridge, said means comprising a power source, a pulley, about which the cable travels, a driving connecting between the power source and the pulley and means to prevent slippage of the chain along the periphery of the pulley.

6. In a settling tank, an annular trough positioned within and below the upper margin of said tank, a bridge, a track adjacent the peripheral wall of the tank adapted to support one end of the bridge, positive means associated with the supported end of the bridge for moving it along the track, means associated with the bridge and adapted to move therewith along the bottom of the tank for collecting material settled therein, said positive means comprising a cable, means for holding it against longitudinal movement, said cable positioned within said trough, means on the bridge adapted to grip the cable and exert a tension thereupon, to cause movement of the bridge, said cable gripping means positioned above the level of liquid within said trough, said means comprising a power source, a pulley, about which the cable travels, a driving connection between the power source and the pulley and means to prevent slippage of the chain along the periphery of the pulley.

7. In a settling tank, an annular trough positioned within and below the upper margin of said tank, a bridge, a track adjacent the peripheral wall of the tank adapted to support one end of the bridge, positive means associated with the supported end of the bridge for moving it along the track, means associated with the bridge and adapted to move therewith along the bottom of the tank for collecting material settled therein, said positive means comprising a cable, means for holding it against longitudinal movement, said cable positioned within said trough, means on the bridge adapted to grip the cable and exert a tension thereupon, to cause movement of the bridge, said cable gripping means positioned above the level of liquid within said trough and in general vertical alignment with said trough, said means comprising a power source, a pulley about which the cable travels, a driving connection between the power source and the pulley and means to prevent slippage of the chain along the periphery of the pulley.

8. In a settling tank, an annular trough positioned within and below the upper margin of said tank, a bridge, extending from the center outwardly toward the periphery of the tank, positive means associated with the end of the bridge adjacent the periphery of the tank for moving it along the periphery of the tank, means associated with the bridge and adapted to move therewith along the bottom of the tank for collecting material settled therein, said positive means comprising a cable, means for holding it against longitudinal movement, said cable positioned within said trough, means on the bridge adapted to grip the cable and exert a tension thereupon, to cause movement of the bridge, said means comprising a power source, a pulley, about which the chain travels, a driving connection between the power source and the pulley and means to prevent slippage of the chain along the periphery of the pulley.

WILLIAM W. SAYERS.